Dec. 15, 1964  G. CZERWENKA  3,161,384
JETTISON TANKS FOR AIRCRAFT
Filed Aug. 31, 1962
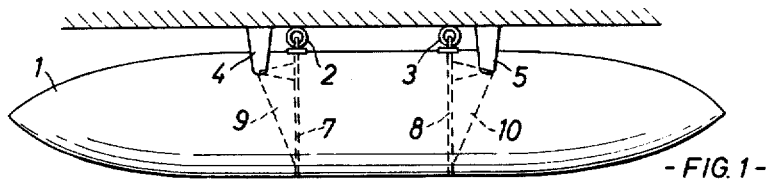
- FIG. 1 -
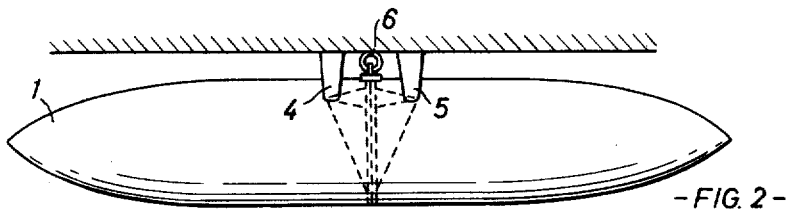
- FIG. 2 -
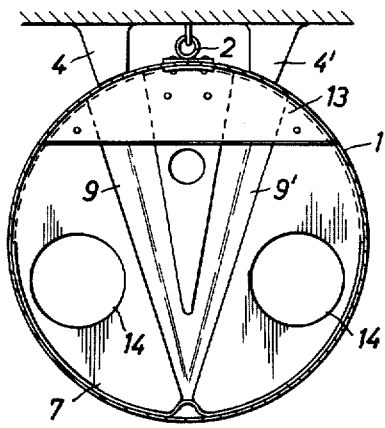
- FIG. 3 -
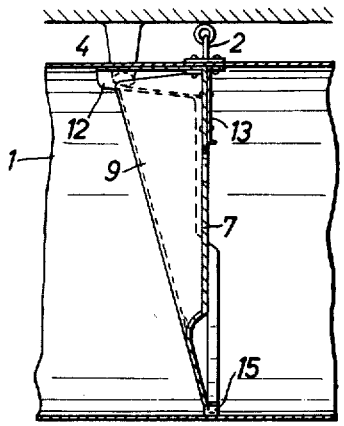
- FIG. 4 -
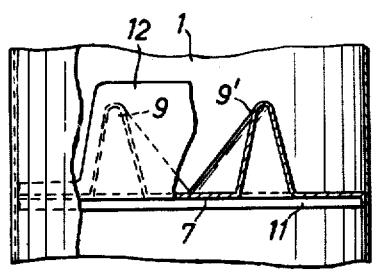
- FIG. 5 -
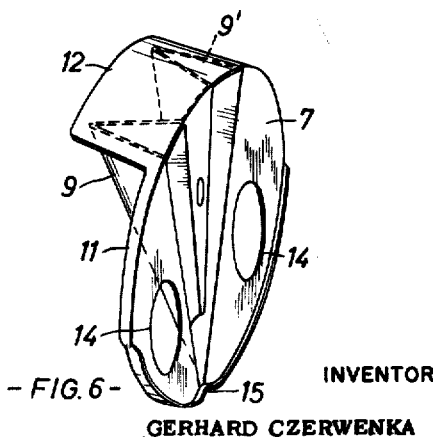
- FIG. 6 -
INVENTOR
GERHARD CZERWENKA
BY
ATTORNEY.

United States Patent Office 3,161,384
Patented Dec. 15, 1964

3,161,384
JETTISON TANKS FOR AIRCRAFT
Gerhard Czerwenka, Bremen, Germany, assignor to Focke-Wulf Gesellschaft mit beschränkter Haftung
Filed Aug. 31, 1962, Ser. No. 220,745
Claims priority, application Germany Sept. 5, 1961
13 Claims. (Cl. 244—118)

The present invention concerns a container more especially a jettison tank adapted to be suspended on the underside of an aircraft.

Elongated containers, more especially jettison tanks suspended in a horizontal position on the underside of aircraft, usually of circular cross-section tapering at the ends, have suspending members on their upper surfaces disposed centrally relative to their longitudinal central plane. The suspending members are in the form of suspending eyelets which are adapted to co-operate with gripping or retaining members fixed to the aircraft. In the case of relatively long and heavy containers however two suspending points are provided, mostly in the longitudinal direction of the container, in spaced relationship to one another. In known containers of this kind a relatively strong annular rib is arranged in the interior of the container below each suspending eyelet and in structural connection therewith.

In order to keep inadmissible bending stresses away from the supporting and holding members subjected to relatively large tension stresses and above all to retain the container correctly positioned and correctly mounted relative to the nacelle in all flying positions, e.g. when banking, supporting brackets are provided in known designs, on the underside of the aircraft, which are arranged in pairs laterally of the longitudinal central plane of the container and in the longitudinal direction fit flush with clearance from the associated suspending point from the outside against the upper container wall.

As the distance of these supporting brackets from the suspending point is relatively short and the occurring lateral forces are very considerable, e.g. when banking with a full container, steps have to be taken to ensure that these forces are kept away from the container walls.

In hitherto known designs therefore a very strong and mostly steel annular rib was arranged in the region of the supporting brackets, which were well able to absorb these considerable pressures. At the same time, however, it was necessary for the container walls, which participate in the supporting bracing to be of thick dimension corresponding to these force conditions at least in the central region of the elongated container, thus in the region of the supporting rib and the cross rib absorbing the pressures of the supporting brackets. This resulted in an increase of weight which is a considerable disadvantage for aircraft.

In consideration of certain filling substances, e.g. corrosive liquids, there was a tendency to use hardenable synthetic resins as the container material. However the manufacture of an adequately strong container wall caused difficulties as the container wall participated in the supporting bracing and was not able to absorb the very high and unfavourably affecting forces. Not even with the internal steel reinforcement, whereby however increased weight and relatively high additional manufacturing costs would have had to be tolerated.

An object of the present invention is to overcome or minimise the above mentioned disadvantages.

A further object of the invention is to produce a container exclusively of plastics material by way of the light construction method, so that the considerable occurring forces are reliably transmitted and also controlled without any additional stressing of the container wall.

Another object of the invention is to arrange a wall-shaped cross rib, forming a rigid area, inside the container only below each suspension member and in structural connection therewith, this rib having on one or both sides bracket-like extensions directed obliquely upwards, which are suitably supported against the container wall and serve as abutments for the supporting bracket, in such a manner that the arising pressure forces are conducted directly into the supporting rib connected with the suspension device, so that separate cross ribs in the region of the supporting brackets may be omitted.

The supporting rib can also consist of several parts which, however, are combined to form a structural unit before the container is installed. Such a design is advisable in the case of only one suspension member being provided and both sides of the supporting rib require bracket-like extensions for four supporting brackets in all.

It is advisable for the bracket-like extensions to be worked e.g. by non-cutting deformation by means of pressing from a relatively thin-walled plate-like body, so that a wall-shaped component is formed which forms the rib and in which the bracket-like extensions present pocket-like structures facing the top which fit over a pressure distributing plate from the inside against the container wall and are rigidly connected thereto, e.g. by cementing. The container used is best composed of an upper and lower shell body with flange-like extending encircling edges, which are rigidly interconnected.

The invention will now be described further, by way of example, with reference to the accompanying drawings, in which:

FIG. 1 is a side elevation of an elongated container tapering at the front and rear, of circular cross-section having two suspension points and four supporting brackets;

FIG. 2 is a side elevation of a container with only one suspension point and four supporting brackets;

FIG. 3 is a cross-section on a larger scale through a container in the region of the supporting rib;

FIG. 4 is a longitudinal section of a supporting rib and the center container portion shown in FIG. 3;

FIG. 5 is a plan partly in section, of the supporting rib shown in FIG. 3; and

FIG. 6 is a perspective view of a supporting rib with pressure brackets pressed out of the rib material.

In the example shown in FIG. 1 an elongated container 1, comprising a lower shell and an upper shell portion, is fixed to the underside of an aircraft by means of two suspension eyelets 2 and 3. Supporting brackets 4 and 5 are provided in pairs at a distance from these suspension eyelets 2 and 3 respectively which, in the effective position, are supported flush against the upper container wall to both sides of the longitudinal central plane of the container. This maintains the container in fixed relation on and with respect to the aircraft for all flying positions.

In the example shown in FIG. 2 only one suspension device 6 is provided on both sides of which supporting brackets 4 and 4' or 5 and 5' are arranged which, in addition are adequately spaced in the longitudinal direction of the container from the suspension device 6. In the example shown in FIG. 1 wall-like ribs or plates 7 and 8 having worked thereon bracket-like extensions 9 and 10 or 9' and 10' arranged in pairs and facing upwards are disposed below the suspension eyelets and in positive connection therewith, the ribs being supported on the inside against the upper container wall and forming the abutments for the supporting brackets 4 and 4' and also 5 and 5'.

The container 1 is made of fibre glass reinforced gellable synthetic resin and has relatively thin walls. Each supporting rib or plate 7 and 8, as evident from FIGS.

3, 4 and 6, when applied to the FIG. 1 example, is a substantially unitary structure, thus of an identical material. The cross-rib shown in FIG. 6 is worked out of a plate-shaped thin-walled piece of synthetic resin deformed by pressing. The bracket-like extensions or protuberances 9, 9' consist of packet-shaped upwardly directed and somewhat spread out bulges of the wall-shaped rib. An encircling edge 11 of the rib member 7 is bent over substantially at right angles to form a relatively wide cementing and supporting surface against the inner wall of the container. This edge 11, in the upper portion in the region of the bulges, is considerably widened to form a pressure distributing plate or flange 12 and welded to or cemented to the edges of the bulges. This pressure distributing plate 12 follows the curvature or arc of the inner wall of the container and hence forms an abutment for the pairs of supporting brackets 4 and 5.

A plate or brace 13 of metal, rigidly connected to the tension device 2 extends over the upper portion of the supporting ribs in abutment therewith and rigidly connected by means of screws, rivets and/or cement. The plate 13 uniformly distributes the tensional forces to the wall-shaped rib 7 simultaneously bridging the two bulges, thus creating a rigid non-bending and non-rotatable rib element.

In order to permit the ribs to be used as surge wall in the case of liquid containers and to effect material savings, apertures 14 are provided in the ribs with the edges of the holes bent over at right angles, so that an edge reinforcement is simultaneously created. A notch-like indentation 15 is provided at the lowermost point of the rib member on the edge, suitable for the passage of liquid from one compartment of the container to the next or for the passage of an internal longitudinal bracing rib, not shown, of the container wall.

In the example shown in FIG. 2 the rib member consists of two symmetrical parts, in accordance with the FIG. 6 design, rigidly joined together back-to-back to form a structural unit. The distributing plate 13 for the tensional forces initiated by the suspension device 6 is situated in the centre between the two symmetrically identical rib members screwed and cemented together. When using rib members as a single rib it is advisable to bend over the encircling edge 11 in the lower part to the opposite side of the bracket-like extensions, as shown in FIGS. 4 and 6. When using two rib members rigidly interconnected, the encircling edges are bent over only to the side of the bracket-like extensions.

The above results in a substantially simplified manufacture of containers of the kind described, as only one rib has to be installed per suspension point. The remarkable saving in weight is obtained from the smaller number of ribs compared with conventional structures and the substantially reduced wall thickness of the container. The cemented connections of the supporting surfaces between rib and inner container wall are subjected to less stress owing to reduced shearing strain. Moreover the container has an improved stability of shape and this in turn results in greater safety against breaking owing to material fatigue.

In the claims, the term "integral" as used in connection with protuberances 9 and 9' is to be interpreted in its broadest sense, as including constructions wherein such protuberances are struck up from the material of the plates 7 or 8 themselves, as well as constructions wherein such protuberances are fabricated independently and subsequently rigidly attached to the plate, as by welding, riveting and/or adhesive.

The term "vertical" as used in the claims refers to the position of the parts as viewed upon the drawing, rather than to any particular position of the tank in actual use upon an aircraft.

I claim:

1. A jettisonable tank for aircraft, and having a central longitudinal fore-and-aft axis of symmetry, a reinforcement plate fitting within said tank centrally thereof, and having a body portion in a plane normal to said axis, said plate having first and second reinforcements integral therewith and extending from a point at the lower end of a vertical line in said plane, through said axis, uniformly divergently upwardly and outwardly of said plane on opposite sides of said line, respectively, the upper ends of said reinforcements conforming to, and fitting the contiguous inner surface of said tank, to form abutments for respective sway brackets fixed with the craft, and means rigidly securing said plate about its periphery, to the contiguous wall of said tank.

2. The tank of claim 1, said last-named means including a segment-shaped brace having an arcuate edge flush with the upper periphery of said plate and rigidly secured in coplanar relation thereto, upon the side thereof opposite said reinforcements and in symmetrical relation with respect to said line.

3. The tank of claim 2, and an arcuate flange integral with the upper peripheral edge of said plate and extending over and secured to the upper ends of said reinforcements, said flange having its outer convex surface fitting and secured to the contiguous inner surface of said tank.

4. A jettisonable tank for aircraft and having a central longitudinal axis of symmetry, a plate fitting the internal circumference of said tank, centrally thereof and in a plane normal to said axis, said plate having first and second integral channel-like hollow protuberances pressed therefrom in the direction of said axis and extending substantially from a point at the lower rim of said plate, divergently upwardly and outwardly in symmetrical relation with and upon opposite sides of a vertical line in said plate, through said point, each said protuberance terminating at its upper end in an edge forming a V converging away from said plate, each said edge conforming to the contiguous inner surface of said tank, and an arcuate flange integrally connected with the periphery of said plate at the top thereof and extending outwardly therefrom along said axis in covering integral relation with both said edges, the outer surface of said flange conforming to, and secured to, the contiguous surface of said tank.

5. The tank of claim 4, each said protuberance increasing uniformly in depth in the direction parallel with said axis, from said point to its said terminal edge.

6. A jettisonable tank for aircraft, said tank having a longitudinal fore-and-aft axis of symmetry, a first plate within said tank and having a plane central body portion normal to said axis and a rim fitting and secured to the interior surface of said tank centrally thereof, said plate having first and second hollow protuberances pressed therefrom each said protuberance extending from the lower end of the vertical diameter of said plate, divergently upwardly and outwardly, each said protuberance terminating at its upper end in an edge forming a V diverging away from said plate, in one direction parallel with said axis, each said edge conforming to the internal contiguous surface of said tank, a flange integral with said first plate and extending in said one direction from the upper peripheral portion thereof, said flange fitting the contiguous surface of said tank and covering and integrally united with both said edges, a supporting shackle external of said tank, means rigidly attaching said shackle to the upper portion of said first plate between said protuberances, each said V edge forming a reinforcing abutment beneath said flange, for a respective one of a pair of sway braces carried by said aircraft.

7. The tank of claim 6, a second plate identical with said first plate, said plates being peripherally secured to the contiguous inner walls of said tank, centrally thereof and in spaced relation along and normal to said axis, the protuberances of each said plate being on the side thereof away from the other plate.

8. A jettisonable tank for aircraft, said tank having a longitudinal fore-and-aft axis of symmetry and being circular in cross section in planes normal to said axis, a pair of circular reinforcement plates fitting within said tank centrally thereof in respective planes normal to and spaced along said axis, each said plate including first and second reinforcements integral therewith and each extending from the lower end of the vertical diameter of said plate uniformly and divergently upwardly, outwardly of the plane of its plate and away from the other plate, each said plate having an integral flange about its periphery, fitting and secured to said tank, the upper portion of said flange being widened in the direction of said axis in overlying relation with, and secured to, the upper ends of both said reinforcements, said widened portion conforming to the contiguous surface of said tank and being secured thereto.

9. The tank of claim 8, each said reinforcement being pressed from its respective plate to form a channel-like protuberance V-shaped in section in horizontal planes parallel with said axis, the size of said V increasing uniformly from said point upwardly.

10. The tank of claim 9, a pair of segment-shaped braces each secured in face-to-face relation with and to the upper portion of its respective plate on the side opposite said reinforcements, the arcuate edges of each plate and brace being flush, and a pair of attachment brackets externally of said tank, each being secured to a respective one of said braces, centrally between the reinforcements of its plate.

11. A jettisonable fuel tank comprising a hollow shell, a reinforcing plate secured to the inner surface of the shell, and bracing means integral with the plate for stiffening the plate; said bracing means comprising at least two legs arranged to form a V and tapering with the bight of the V closest to the plane of the plate and the free ends of the V at a maximum distance from the plane of the plate.

12. A device as in claim 11 wherein each leg is V shape in cross-section.

13. A device as in claim 11 further comprising a tab integral with the open end of the V.

References Cited in the file of this patent

UNITED STATES PATENTS

| | | |
|---|---|---|
| 2,365,080 | Humphreys | Dec. 12, 1944 |
| 2,648,454 | Dean | Aug. 11, 1953 |
| 2,755,045 | Schmidt | July 17, 1956 |
| 2,838,261 | Amos et al. | June 10, 1958 |
| 2,895,635 | Pollard et al. | July 21, 1959 |
| 2,952,427 | Armstrong | Sept. 13, 1960 |